Aug. 24, 1965   B. LOFTIN   3,202,565
MOLDED BRASSIERES
Filed Sept. 27, 1961
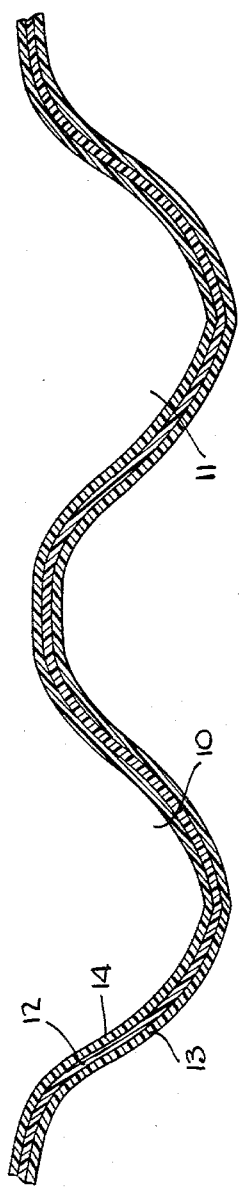

United States Patent Office 3,202,565
Patented Aug. 24, 1965

3,202,565
MOLDED BRASSIERES
Billy Loftin, Charlotte, N.C., assignor to Celanese Corporation of America, New York, N.Y., a corporation of Delaware
Filed Sept. 27, 1961, Ser. No. 141,172
7 Claims. (Cl. 161—73)

This invention relates to molded articles and more particularly to contour molded brassieres.

It is an object of this invention to provide novel molded laminated textile articles.

It is a further object of this invention to provide a novel molded brassiere.

Other objects and advantages of this invention will become apparent from the following description and claims in which all proportions are by weight unless otherwise stated.

In accordance with one aspect of this invention, a novel molded article is prepared by sandwiching a layer of fibrous material, preferably a non-woven fibrous batt, containing bonding agent intermediate a pair of layers of preformed fabric. The sandwiched structure is then molded into a desired shape, which is preferably three dimensional, and the layers are bonded together. The molding and bonding are advantageously accomplished simultaneously and preferably through the application of heat.

The term "preformed fabrics" as used in this specification is meant to include fabrics of substantial cohesive strength, e.g., knit and woven fabrics, bonded non-woven fabrics and the like.

Highly advantageous results have been achieved by applying the process of this invention to the production of non-woven molded laminated structures. In accordance with a specific aspect of this invention, the preformed outer layers and the inner layer are formed of non-woven fibrous webs or batts. The fibers in the outer preformed fabrics may, if desired, have the same composition as those in the inner web. The outer layers are preferably preformed by completing the bonding of the fibers in the non-woven webs into a non-woven fabric prior to the incorporation of such fabrics into the sandwiched structure of this invention. For example, where the bonding agent is applied as an aqueous emulsion, the impregnated outer webs are oven cured till dry prior to their use in this invention. The intermediate layer, on the other hand, is preferably not preformed. It contains bonding agents which has not as yet bonded the fibers into a preformed fabric. In other words, it is a potential fabric or a fabric precursor but lacks the strength or cohesion between fibers necessary in a non-woven fabric. It may be referred to as a "pre-fabric."

Preferably, the intermediate layer is wet with the bonding agent. For example, where an emulsion type of adhesive is used, the intermediate layer is wet with the aqueous emulsion.

The three layers, the outer preformed non-woven fabrics and the inner wet web, are then sandwiched upon each other between complementary dies in a heated mold, said dies being operatively associated with each other to produce a selected three dimensional structure. In such an operation, part of the bonding agent contained in the intermediate layer is forced into the two outer layers. Thus, when the bonding agent sets, the fibers of the intermediate layer will be bonded into a non-woven fabric and the intermediate layer will be bonded to the non-woven outer layers to form a laminated sandwiched structure which in turn has been molded into a desired three dimensional shape.

The non-woven fabrics may be composed in whole or in part of thermoplastic fibers representative examples of which include polyamides such as nylon, polyesters such as polyethylene terephthalate, polymers and copolymers of vinylidene compounds such as ethylene, propylene, vinyl chloride, vinyl acetate, acrylonitrile, vinylidene cyanide and the like. Especially good results are achieved with organic acid esters of cellulose such as cellulose acetate, cellulose propionate, cellulose butyrate, cellulose acetate formate, cellulose acetate propionate, cellulose acetate butyrate, cellulose triacetate and the like.

Advantageously, the thermoplastic fibers comprise more than about half of the non-woven webs by weight. The component fibers may be crimped or straight and may range in denier from about 0.5 or less up to about 50 or even more. The non-woven web can be formed in conventional manner as by air blowing, air forming carding, or the like. The weights and thicknesses of the webs will, of course, vary with the intended end use of the sandwiched structures.

The nature of the bonding agent used will depend to a large extent on the nature of the layers being bonded as well as the end use for the laminated structure. In producing molded brassieres, as will hereinafter be described in greater detail, the bonding agents preferably comprise resins including polymers and copolymers of vinylidene compounds such as vinyl esters, styrenes, acrylates, acrylonitrile, butadiene and the like, the polymers advantageously being elastic such as rubber, natural or synthetic. The bonding agent may be the undiluted resin, a solution of the resin or an aqueous emulsion or latex of the same. In addition, plasticizers for the fibers contained in the sandwiched webs may be used as the bonding agent. Other agents such as aminoplast precondensates, e.g., urea formaldehyde and particularly melamine formaldehyde, may be incorporated in the binder latices in about 5 to 15% to improve the washability of the products.

The molded articles of this invention find particular application in forming novel laminated molded brassieres. The brassiere comprises a pair of outer layers made of preformed fabric and an intermediate layer sandwiched therebetween. The outer layers preferably comprise thermoplastic fibers, most preferably organic esters of cellulose such as cellulose acetate. Advantageously at least one of the outer layers is made from a non-woven web of staple fiber produced by any convenient means such as garnetting or carding. The outer layers when preformed from non-woven structures are treated with a bonding agent to bond the fibers into a non-woven fabric prior to being formed into the molded brassiere. Desirably that one of the layers which is to contact the body of the wearer is knit to achieve softness and ready conformity. The intermediate layer comprises a non-woven batt, preferably not preformed. The bonding agent is applied to the intermediate layer and before the bonding agent is activated, i.e., while the intermediate layer is still wet with the bonding agent, it is sandwiched between the outer layers and heat molded as previously described using complementary dies in the shape of a brassiere. It is preferable that the three sandwiched layers comprise the same fibers. In making molded brassieres, it is preferable that an emulsion or latex type of bonding agent be used, that is aqueous emulsions of the previously described resins and most preferably an acrylic emulsion. In the production of the molded brassiere, it is preferable that each of the layers has a fiber weight of from about 2 to 10 ounces per square yard. It is preferable that the brassiere be molded at a temperature of from about 250 to 375° F. for a period of from about 90 to 300 seconds. The preformed fabrics on both sides of the intermediate binder-impregnated layer serve to soak up the excess binder thereby improving the quality of the bond and facilitating withdrawal of the composite structure from the mold.

The novel molded articles of this invention are illustrated by the novel molded brassiere shown in longitudinal section in the accompanying drawing. The brassiere has the conventional form. The numerals 10 and 11 indicate the breast cups. Intermediate layer 12 is sandwiched between outer layers 13 and 14. Outer layers 13 and 14 are preformed layers, their fibers being bonded by a bonding agent which had been activated and cured prior to the molding of the brassiere. The intermediate layer is not preformed. It is preferred that the amount of bonding agent which migrates into the outer layers comprises at least 10% and most preferably from about 25 to 75% of the total bonding agent remaining in the intermediate layer. When the bonding agent from the intermediate layer sets during molding, the deposits which migrated into the outer layers will be integral with the deposits remaining in the intermediate layer.

The following examples will illustrate the practice of this invention:

*Example I*

A non-woven web having a weight of 3.0 ounces per square yard comprising 5.5 denier and 1 9/16 inch length staple fibers of cellulose acetate is immersed in a 23% aqueous emulsion of Hycar 2671 bonding agent (a carboxypolyethyl acrylate marketed by B. F. Goodrich Company) squeezed at a pressure of 40 pounds per square inch to a liquid pick up of 120% of its dry weight and oven dried and cured at 325° F. for two minutes. The preformed cured fabric contains 28% by weight of bonding agent.

Two layers of said cured fabric are then sandwiched about an intermediate layer of a non-woven web having 7 ounces per square yard of 5.5 denier, 1 9/16 inch staple fibers of cellulose acetate and 4 ounces per square yard of a 23% aqueous emulsion of the Hycar 2671 bonding agent. The three layered sandwiched structure is then contour molded into the shape of a brassiere by pressing said structure between a pair of complementary dies, each heated to 300° F. for a period of about 4 minutes.

*Examples II*

A needle punched non-woven web having a weight of 6.8 ounces per square yard comprising 5.5 denier, 1 9/16 inch staple fibers of cellulose acetate is immersed in a 23% aqueous emulsion of Hycar 2671 bonding agent, squeezed to a liquid pick up of 120% of its dry weight and oven dried and cured at 325° F. for two minutes. The fabric contains about 25% by weight of bonding agent. (Fabric A).

Another fabric identical to the above is prepared by the same method but is not dried and cured (Fabric B).

A tricot knit fabric of cellulose acetate fibers weighing 3 ounces per square yard is immersed in the above bonding agent and squeezed to a liquid pick up of about 120% of its dry weight. It is then dried and cured at 325° F. for two minutes. The cured fabric contains about 25% by weight of bonding agent (Fabric C).

Fabric B is sandwiched between Fabrics A and C. The sandwiched structure is then contour molded into the shape of a brassiere, with the tricot constituting the inside layer, by pressing said structure between a pair of complementary dies, each heated to 300° F. for a period of 4 minutes.

*Example III*

Example II is repeated using the same proportions, materials and ingredients except that the fibers are 100% 5 denier 2 inch cellulose triacetate and the brassiere is molded for one minute at 325° F. followed by one minute at 300° F.

*Example IV*

Example II is repeated using the same proportions, materials and ingredients except that each of the layers in the sandwiched structure comprises 3 denier, 2 inch polyethylene terephthalate staple fibers and the brassiere is molded at 325° F. for 2 minutes.

The brassieres produced in accordance with Examples I–IV, as compared with heat molded brassieres in which all three layers are preformed, have greatly increased resistance to soap and detergent water washing, i.e. the novel brassieres display greater shape retention when washed with soaps and detergents.

In addition, the molded articles of this invention display greatly increased strength as compared to conventional bonded articles.

It is to be understood that while only three layered structures have been described, the scope of this invention comprehends structures having a greater number of layers. In such structures, the outer layers would be preformed fabrics and the inner layers would be alternating layers of preformed and non-formed fabrics.

It is to be understood that the foregoing detailed description is given merely by way of illustration and that many variations may be made therein without departing from the spirit of my invention.

Having described my invention what I desire to secure by Letters Patent is:

1. A molded brassiere comprising two outer fabric layers and an intermediate fabric layer therebetween, said intermediate layer containing deposits of a bonding agent integral with deposits of the same bonding agent in said outer fabric layers, the concentration of said bonding agent being greatest in said intermediate layer and diminishing in said outer layers in such a manner that the amount of said bonding agent in said outer layers comprises at least about 10% of the amount of said bonding agent present in said intermediate layer.

2. The brassiere defined in claim 1, wherein said intermediate layer is a non-woven fabric comprising thermoplastic fibers.

3. The brassiere defined in claim 2, wherein said outer layers are non-woven fabrics comprising thermoplastic fibers.

4. The brassiere defined in claim 3, wherein said outer and intermediate layers have the same fiber composition.

5. The brassiere defined in claim 2, wherein said outer and inner layers comprise cellulose acetate fibers.

6. A molded brassiere comprising a first body-contacting layer, a second intermediate layer and a third outer layer, said layers comprising thermoplastic fibers, the first body-contacting layer being knit and the second intermediate layer containing deposits of a bonding agent integrally with deposits of said bonding agent in said outer fabric layers, the concentration of said bonding agent being distributed in such a manner that the amount of said bonding agent in said outer layers comprises at least about 10% of the amount of said bonding agent present in said intermediate layer.

7. The brassiere defined in claim 6, wherein said intermediate layer constitutes a non-woven batt.

References Cited by the Examiner

UNITED STATES PATENTS

| | | | |
|---|---|---|---|
| 2,285,967 | 6/42 | Hardy | 264—292 |
| 2,391,417 | 12/45 | Hill | 128—463 |
| 2,472,940 | 6/49 | Cummings | 128—463 |
| 2,686,312 | 8/54 | Schmidt | 128—463 |
| 2,727,278 | 12/55 | Thompson | 264—45 |
| 2,949,394 | 8/60 | Rodman | 161—151 |
| 2,989,431 | 6/61 | Cole | 161—151 |
| 3,064,329 | 11/62 | Westberg et al. | 28—74 |
| 3,070,870 | 1/63 | Alexander et al. | 28—74 |
| 3,077,196 | 2/63 | Paxton | 128—463 |

ADELE M. EAGER, *Primary Examiner.*

DELBERT B. LOWE, LOUIS R. PRINCE, *Examiners.*